July 17, 1956
A. STAMMEL
2,754,803
LEVER OPERATED MULTIPLE STANCHION RELEASE
Filed June 21, 1954
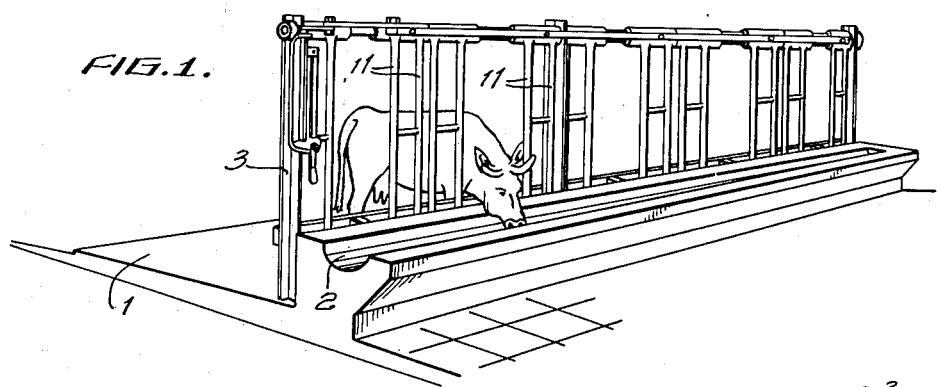
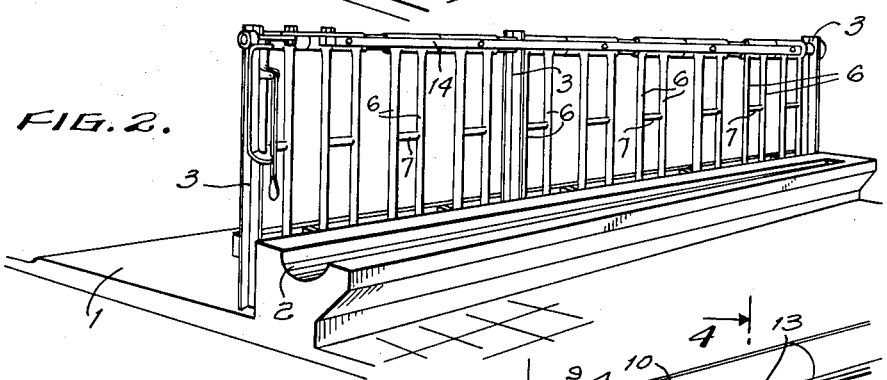
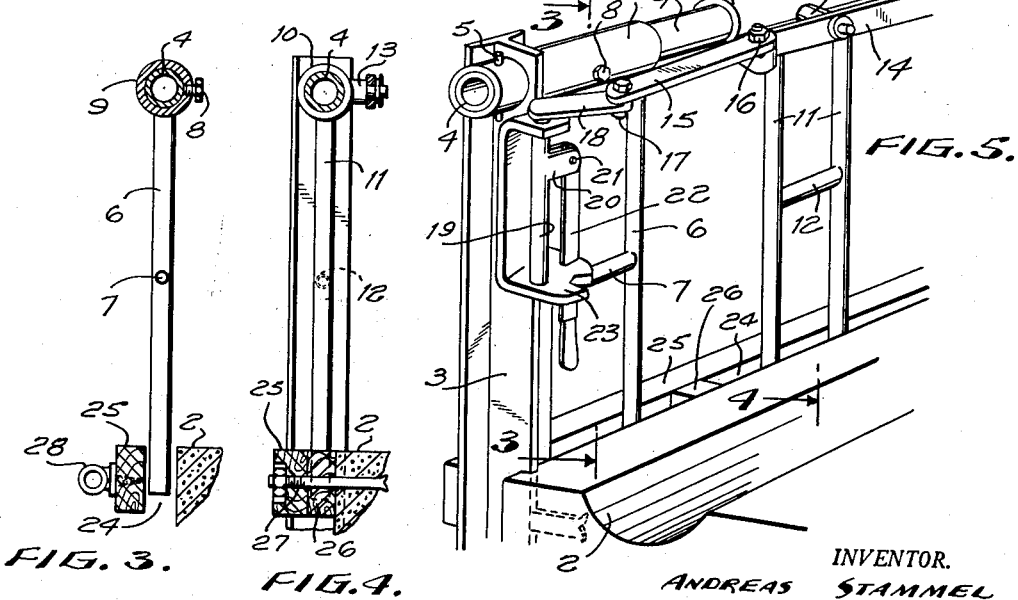
INVENTOR.
ANDREAS STAMMEL
BY
ATTORNEY United States Patent Office 2,754,803
Patented July 17, 1956

2,754,803

LEVER OPERATED MULTIPLE STANCHION RELEASE

Andreas Stammel, Ziemetshausen-Schwaben, Germany

Application June 21, 1954, Serial No. 438,161

4 Claims. (Cl. 119—148)

The present invention relates to a feeding gate with adjustable gate rods.

It has been proposed before to provide feeding gates which were equipped with horizontally disposed rods which had the drawback of rather complicated construction and function, to change such gates from the inoperative position into the operative position. In addition, such gates had the disadvantage of bringing about the danger that the horn of the cattle gets caught in the rods.

It is, therefore, one object of the present invention to provide a feeding gate which comprises a plurality of vertically disposed gate rods which are movably guided in an open slot of the cattle base, thereby preventing any rusting or rotting, and also permitting easy exchange of any one of the rods of the gate without breaking the concrete of the cattle base.

It is another object of the present invention to provide a feeding gate which comprises a plurality of parallel substantially vertically disposed rods with means permitting parallel substantially horizontal movement of at least some of the rods, thereby providing that the head of the cattle can project through the gate into the food trough.

It is still another object of the present invention to provide a feeding gate which comprises a plurality of parallel vertically disposed rods, some of which are immovably mounted and extend into a slot provided in the cattle base, which slot is open at its bottom; the said slot being in one embodiment formed by a squared timber which simultaneously may function as chain holder, which arrangement not only provides a very economical chain holder mounting, but also affords electrical insulation of the chains against lightning.

It is also a further object of the present invention to provide a feeding gate which comprises a plurality of parallel vertical rods, which are secured to sleeve members mounted on a horizontally disposed tubular member, and by securing some of the sleeves to the said tubular member, some of the vertically disposed rods are immovable while others are movable in horizontal direction by moving its corresponding sleeve along the said tubular member.

With these and other objects in view which will become apparent in the following detailed description, the present invention will be clearly understood in connection with the accompanying drawing in which:

Figure 1 is a perspective front view of the feeding gate, the latter being in open position;

Fig. 2 is a similar perspective front view, the gate being shown in closed position;

Fig. 3 is a fragmentary section along the lines 3—3 of Fig. 5;

Fig. 4 is a section along the lines 4—4 of Fig. 5;

Fig. 5 is a perspective front view of a portion of the gate shown on a large scale.

Referring now to the drawings, the feeding gate comprises a cattle base 1 which is integrally formed at its front to a food trough 2 and is preferably made of concrete. The feeding gate is disposed above the cattle base 1 and immediately behind the food trough 2.

The feeding gate itself comprises a plurality of posts 3, for instance, a T-iron, the leg of which has a boring through which extends a tubular member 4 secured therein by a pin 5. A plurality of pairs of vertically disposed rods 6 connected together by a leg 7 are provided along the tubular member 4 and each such pairs of rods 6 is connected to a sleeve 9 mounted on the tubular member 4. All sleeves 9 are secured to the tubular member 4 by a set screw 8, in order to prevent the movement of the sleeves 9 on the tubular member 4. In this manner, all pairs of vertically disposed rods 6 are immovably mounted on the tubular member 4 in predetermined spaced relation.

The tubular member 4 carries a second set of a plurality of sleeves 10 and a pair of rods 11 is secured to each of the sleeves 10, each pair of rods 11 being again connected together by a leg 12. The sleeves 10 are axially movable on the tubular member 4 and they carry a bolt 13. All said bolts 13 are connected by a track 14. One end of the track 14 has a link 15 secured thereto by a pivot 16 while the other end of the link 15 is secured to a crank lever 18 by means of a pivot 17. The other end of the crank lever 18 is keyed to a crank axle 19 from which an arm 20 projects. A hand lever 22 is pivotally connected to the arm 20 by means of a pin 21. The hand lever 22 is mounted to swing from a locking disk 23 to turn the axle 19 and thereby bringing about a reciprocating movement of the track 14 to assume the two positions as shown in Figs. 1 and 2 respectively.

The food trough 2 forms one wall of the slot 24 which is open at its bottom, while its other wall is formed by a timber 25 which is secured to the food trough 2 by means of the bolt 27 extending to the intermediate distance member 26. The lower ends of the immovable rods 6 as well as of the displaceable rods 11 extend into the slot 24. The chain holders 28 are also secured to the timber 25.

While I have disclosed one embodiment of the present invention, this embodiment is given by example only and not in a limiting sense, the scope of the present invention being determined by the objects and the claims.

I claim:

1. A feeding gate comprising a cattle base having a crosswise disposed slot, open at its bottom, a support, a plurality of first immovable and vertically disposed rods arranged in predetermined spaced relation, and a plurality of second vertically disposed rods movable in horizontal direction, each of the said movable rods being disposed between a pair of adjacent immovable rods in order to increase the distance between the said movable rod and one of its adjacent immovable rods in the operative position of the gate and to reduce the said distance in the inoperative position of the gate, lever operated means moving all the said movable rods simultaneously parallel to themselves relative to the said immovable rods, and all the said rods extending into the said slot of the cattle base.

2. The feeding gate, as set forth in claim 1, which includes at least one crosswise disposed timber forming one wall of the said slot in the cattle base, and a plurality of chain holders secured in spaced relation to the said timber.

3. A feeding gate comprising a cattle base, a plurality of vertically disposed posts permanently mounted on the said base in spaced relation from each other, a horizontally disposed tubular member supported by the said posts, a plurality of first pairs of vertically disposed rods and a plurality of second pairs of vertically disposed rods, each pair of the said vertically disposed rods being secured to a sleeve slidably mounted on the said tubular member, each pair of the said second pairs of vertically disposed rods being disposed between two adjacent pairs of the said first pairs of vertically disposed rods, means for releasably locking the said sleeves of the said first pairs of vertically disposed rods to the said tubular member, and lever operated means associated with the said sleeves of the said second pairs of vertically disposed rods for moving all said second pairs of vertically disposed rods along the said tubular member relative to the said first pairs of vertically disposed rods.

4. A feeding gate comprising a cattle base, a plurality of vertically disposed posts permanently mounted on the said base in spaced relation from each other, a horizontally disposed tubular member supported by the said posts, a plurality of first pairs of vertically disposed rods, and a plurality of second pairs of vertically disposed rods, each pair of the said vertically disposed rods being secured to a sleeve slidably mounted on the said tubular member, each pair of the said second pairs of vertically disposed rods being disposed between two adjacent pairs of the said first pairs of vertically disposed rods, means for releasably locking the said sleeves of the said first pairs of vertically disposed rods to the said tubular member, and lever operated means associated with the said sleeves of the said second pairs of vertically disposed rods for moving all said second pairs of vertically disposed rods along the said tubular member relative to the said first pairs of vertically disposed rods, and the said sleeve moving means comprises a bolt extending from each of the said sleeves of the said second pairs of vertically disposed rods, and a track is secured to the outer end of each of the said bolts, one end of the said track being pivoted to one end of a link, the other end of the latter being pivoted to one end of a crank lever, a vertically disposed axle, and the other end of the said crank lever being keyed to the said axle, an arm projecting perpendicularly from the said axle and a hand lever pivotally secured to the said arm in order to turn the said axle upon its own axis by operation of the said hand lever and, thereby, to transfer a reciprocating movement to the said track and, thus, to all said sleeves of the said second pairs of vertically disposed rods.

References Cited in the file of this patent

UNITED STATES PATENTS

| | | |
|---|---|---|
| 1,486,713 | Wilson | Mar. 11, 1924 |
| 1,514,429 | Burmester | Nov. 4, 1924 |
| 2,408,872 | Newbold | Oct. 8, 1946 |
| 2,625,907 | Montero | Jan. 20, 1953 |

FOREIGN PATENTS

| | | |
|---|---|---|
| 263,197 | Switzerland | Nov. 16, 1949 |